WIRE-BENDING APPARATUS

Original Filed May 19, 1965 6 Sheets-Sheet 1

INVENTOR
ERNST G. OTT

Barnard, McGlynn & Reising
ATTORNEYS

WIRE-BENDING APPARATUS

Original Filed May 19, 1965 6 Sheets-Sheet 2

Barnard, McGlynn & Reising

WIRE-BENDING APPARATUS

Original Filed May 19, 1965 6 Sheets-Sheet 3

INVENTOR
ERNST G. OTT

Barnard, McGlynn & Reising
ATTORNEYS

WIRE-BENDING APPARATUS

Original Filed May 19, 1965 6 Sheets-Sheet 4

INVENTOR
ERNST G. OTT
Barnard, McGlynn & Reising
ATTORNEYS.

WIRE-BENDING APPARATUS

Original Filed May 19, 1965 6 Sheets-Sheet 5

INVENTOR
ERNST G. OTT

Barnard, McGlynn & Fleming
ATTORNEYS.

WIRE-BENDING APPARATUS

Original Filed May 19, 1965 6 Sheets-Sheet 6

INVENTOR
ERNST G. OTT

Barnard, McGlynn & Reising
ATTORNEYS.

United States Patent Office

Re. 27,021
Reissued Jan. 5, 1971

27,021
WIRE-BENDING APPARATUS

Ernst G. Ott, Chigwell, England, assignor to Lear Siegler, Inc., a corporation of Delaware Original No. 3,393,714, dated July 23, 1968, Ser. No. 456,981, May 19, 1965. Application for reissue July 24, 1969, Ser. No. 862,983
Int. Cl. B21f *1/00*
U.S. Cl. 140—71 31 Claims

Matter enclosed in heavy brackets [ ] appears in the original patent but forms no part of this reissue specification; matter printed in italics indicates the additions made by reissue.

ABSTRACT OF THE DISCLOSURE

The specification and drawings disclose a machine for bending wire into formed wire spring strips of the type used in automotive seats. The machine comprises a bending head mounted on a frame for rotary movement about an axis and longitudinal movement along the axis. The machine is programmed to run through repeating cycles to produce a spring strip for each cycle. The bending head starts from a retracted position wherein it clamps the free end of a coil of wire. It then moves longitudinally to its advanced position, pulling the wire through a wire straightener as it advances. The bending head is then retracted step by step along the wire back to the retracted position, stopping at predetermined axial positions to make bends in the wire. After a predetermined number of bends, the bending head automatically cuts the wire to complete the formation of the spring strip, and ready the machine for the next cycle. Easily changeable camming means is provided to facilitate programming the machine to produce any one of a large number of different spring strips with changeover time reduced to a matter of minutes.

This invention relates to wire-bending apparatus and more particularly, it concerns an apparatus for forming, in a single continuous operation, undulating springs of the type used in furniture and automotive seat constructions and which is readily adaptable to form such springs of any desired configuration.

Springs of the type in which a single length of wire is bent to form a series of undulations have been widely accepted to provide a spring surface for resiliently supporting cushions above a frame. Generally, such springs are characterized as having a plurality of spaced, transversely oriented portions known as torsion bars connected alternately on opposite sides by bending bars or links. Any given pair of torsion bars, therefore, establish the plane of the undulation including that pair of torsion bars. The configuration of such an undulating spring in its ultimate form is determinative of the supporting characteristics it provides in a particular cushion application. For example, by increasing or decreasing the spacing between torsion bars over certain portions of the spring length a predetermined cushion support is obtained. Also, the manner in which the spring is shaped to establish different planes of undulation will determine its support characteristics in a given size and shape of cushion. This latter characteristic is particularly significant for example along the front and rear edges of a seat cushion where the spring is connected to the frame.

Although the supporting characteristics of differently shaped undulating springs of this type are well known, considerable difficulty has been experienced in their manufacture. Prior to this invention, various types of apparatus have been employed which have presented serious problems of adjustability in that converting them from an adjusted arrangement for forming one particular shape of spring to an arrangement of components to form a different shape has required much time and labor. To illustrate, machines heretofore available for the formation of undulating springs have usually involved a plurality of bending dies appropriately spaced to develop the desired spring configuration. While such machines have been generally satisfactory, converting them to form different spring shapes has involved adjusting each of the several bending dies to a different position. Such adjustment of each of the bending dies involves a tedious complicated procedure resulting in a substantial loss of production time. Another problem encountered with spring forming machines available in the past is that they present difficulties in bending the spring wire in more than one plane. To overcome this problem it is conventional to first form the undulated spring into a uniplanar strip on one machine and then on a different machine or in a different operation bending the strip thus formed into its ultimate shape in which the undulations lie in different planes. This procedure not only also requires much time but involves unnecessary bending operations which introduce error and in some instances weaken the spring wire significantly.

The wire-bending machine in accordance with the present invention is generally characterized as having a carriage supported rotatable bending head movable along a straight length of spring wire under appropriate controls to effect substantially any shape of undulating spring in one continuous operation. Basically, carriage position establishes the point in the wire where a bend is to be made whereas the angular position of the head about the axis of the wire determines the direction of bend. Both of these functions are controlled by an easily adjustable programming arrangement, such as a replaceable cam track or the like, adapted to be followed by a control device on the carriage or head. Various other features are provided which render the machine capable of complete automatic control.

Accordingly, it is a principal object of this invention to provide a wire-bending apparatus particularly suited to the formation of undulated, cushion support springs by which problems of adjustability experienced with previous apparatus of this general type are effectively and substantially overcome.

Another object of this invention is the provision of a wire-bending machine of the type aforementioned having a bending head which is capable of being programmed to develop any desired undulating spring shape.

A further object of this invention is the provision of a wire-bending apparatus which may be controlled automatically to form a complete undulating spring structure in a single continuous operation so that no more than one bend at any given point on a wire is required to develop the ultimate spring configuration.

Still another object of this invention is the provision of a wire-bending machine of the type aforementioned which is self-feeding in the sense that it operates to draw a length of wire from a supply prior to bending and which is capable also of severing the formed length of spring from the wire stock at the end of a bending cycle.

Other objects and further scope of applicability of the present invention will be appreciated from the detailed description to follow taken in conjunction with the accompanying drawings in which.

Figure 1:
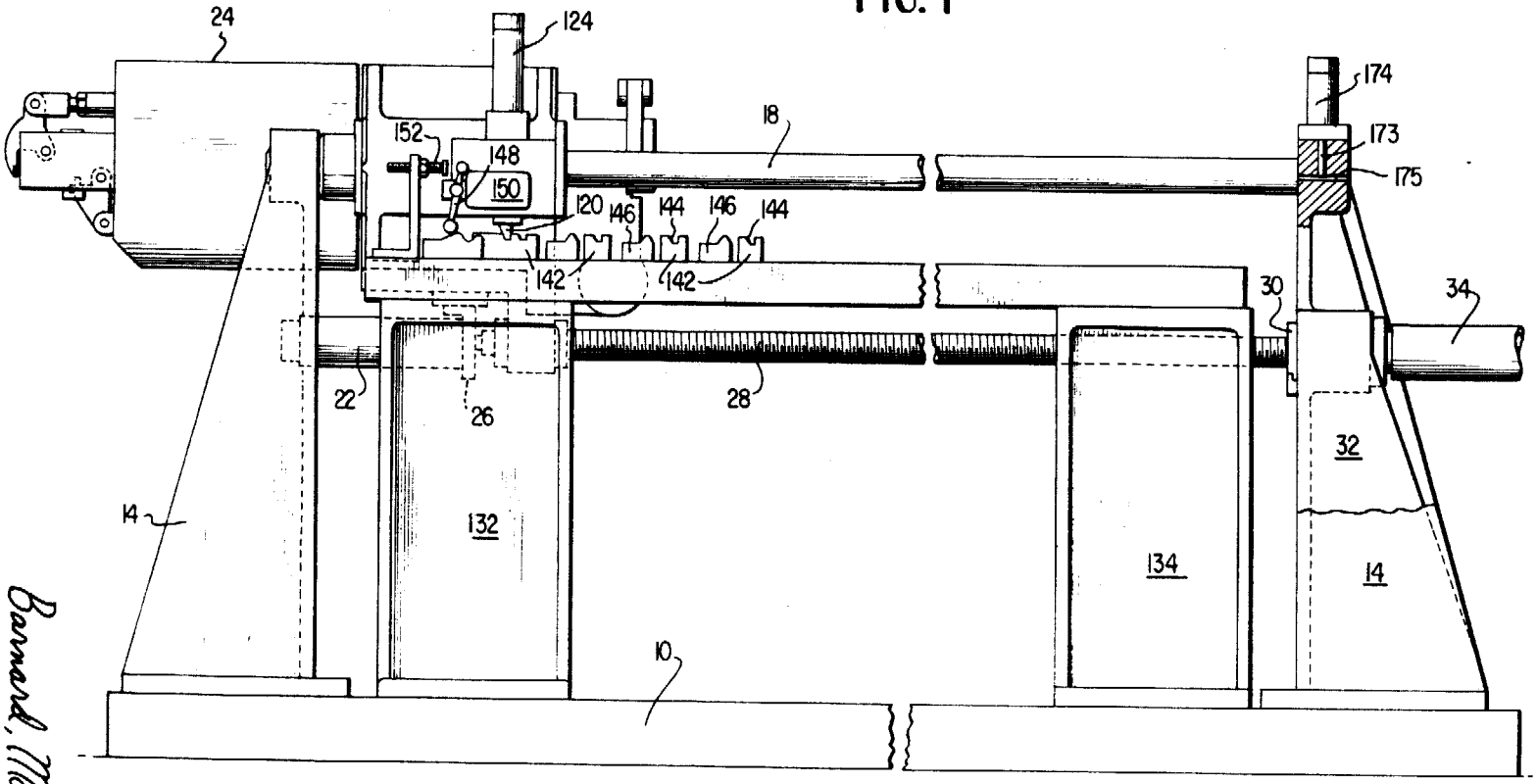
FIG. 1 is a side elevation of the wire-bending machine of this invention.
Figure 2:
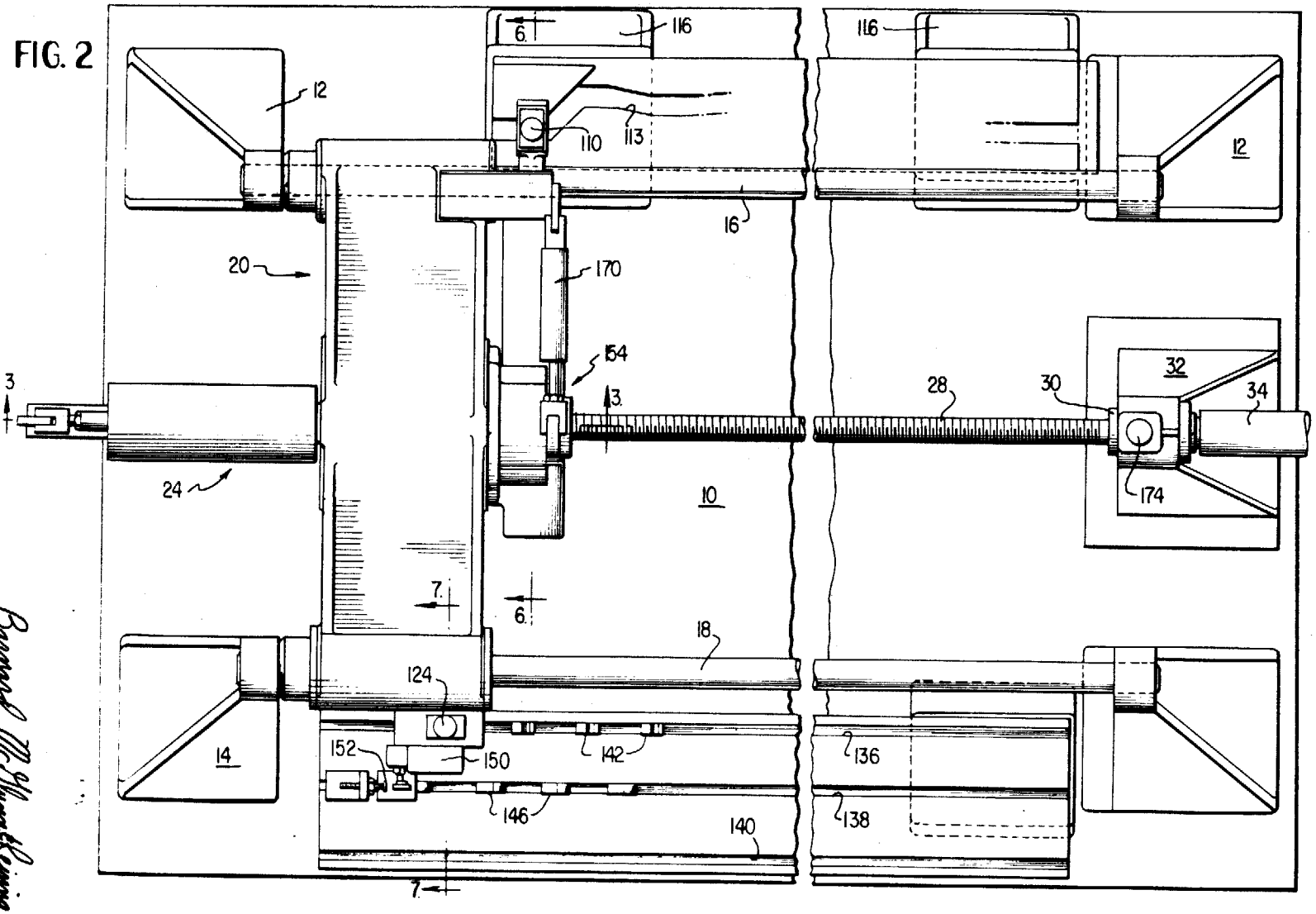
FIG. 2 is a plan view of the machine illustrated in FIG. 1.

Referring now to the drawings and particularly to FIGS. 1 and 2 thereof, it will be noted that the wire-bending apparatus of this invention is shown supported on a pedestal designated by the reference numeral 10. Two pairs of standards 12 and 14 respectively are supported on the pedestal 10, one pair to each side thereof. The standards 12 and 14 in turn support a pair of cylindrical ways 16 and 18 extending parallel to each other along the length of the pedetsal 10 and thus of the machine. The ways 16 and 18 movably support a carriage 20 on which is mounted an air motor 22 and a rotatable bending head 24 which will be described in more detail below. The air motor is supported from the underside of the carriage by a bracket 26 and is operatively connected to a rotatable feed screw 28 journaled at one end in the carriage 20 and threaded through a non-rotatable nut 30 supported above the pedestal 10 by a standard 32. A tubular shield 34 is also supported at one end by the standard 32 to extend rearwardly of the machine and house the portion of the screw 28 projecting through the nut 30.

Figure 3:
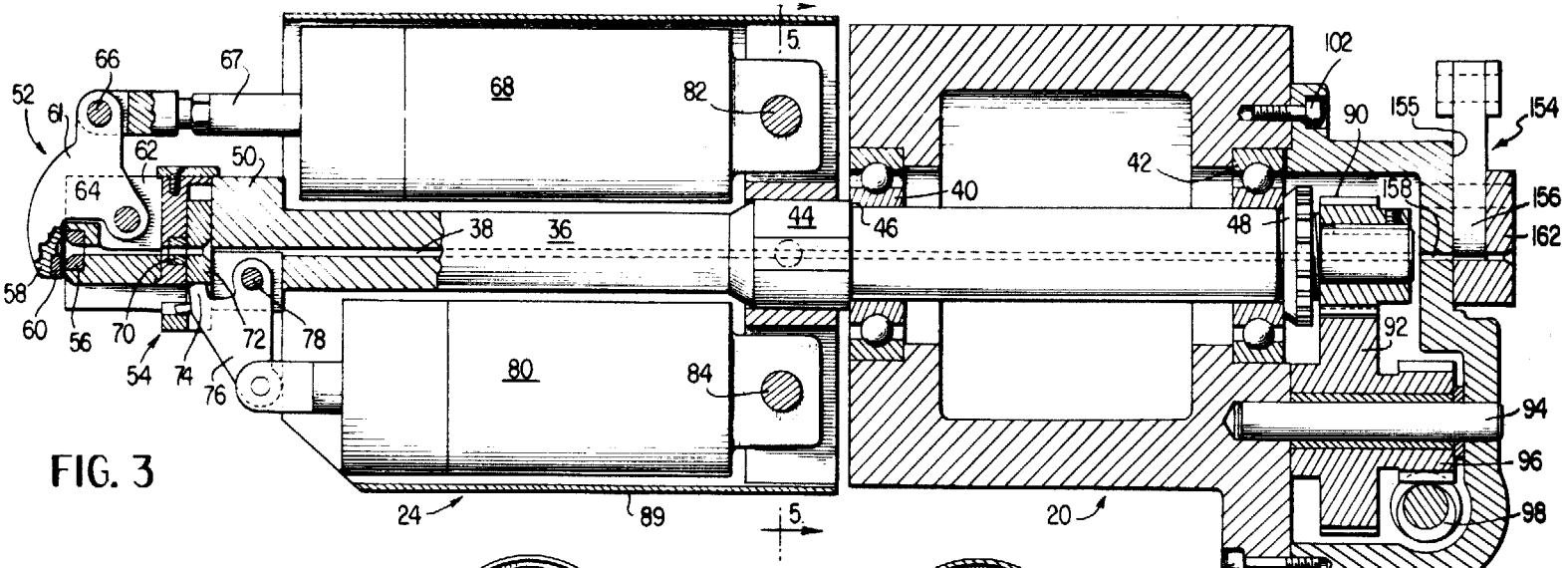
FIG. 3 is an enlarged fragmentary cross-section taken along line 3—3 of FIG. 2.
Figure 5:
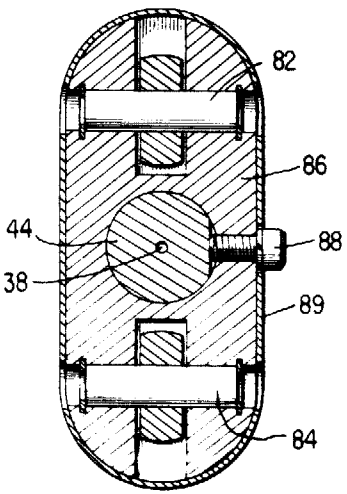
FIG. 5 is a cross-section taken on line 5—5 of FIG. 3.
Figure 4:
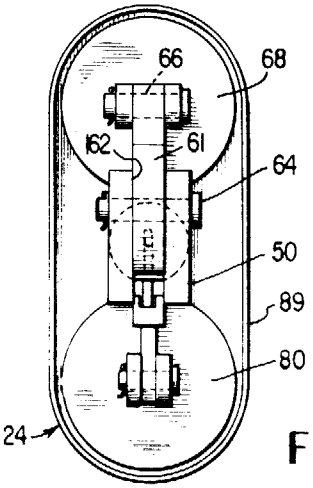
FIG. 4 is an elevation of the left end of the apparatus shown in FIG. 3.

A more complete understanding of the carriage 20 and the component supported thereon including the rotatable bending head 24 may be had by reference to FIGS. 3–7 of the drawings. As shown in FIG. 3, a rotatable shaft 36 having a central wire guide bore 38 extending axially throughout the length thereof is cantilevered forwardly of the carriage 20 or to the left thereof as shown in the drawings. The shaft 36 is rotatable about the axis of the wire guide bore 38 by virtue of its support in bearings 40 and 42 positioned at the front and rear ends of the carriage 20, respectively. Although the shaft 36 carries little or no thrust load in operation, it is secured against axial displacement with respect to the carriage by an enlarged boss 44 defining a shoulder 46 in abutment with the bearing 40 and a threaded nut 48 abutting against the opposite side of the bearing 42. The forward end of the shaft 36 terminates in an enlarged rectangular portion 50 for supporting a wire bender generally designated by the reference 52 and a wire cutter 54. The wire bender includes a circular anvil defined by an annular insert 56 on the axis of the wire guide bore 38 and an oscillating bending finger 58 having a die insert 60 at its lower end. The bending finger 58 is formed as an extension of a bell crank lever 61 pivotally secured in a radial slot 62 formed in the enlarged portion 50 of the shaft by a pin 64. The other arm of the bell crank lever 61 is pivotally connected by a pin 66 to the end of a reciprocable plunger 67 of a piston-cylinder motor 68.

The wire cutter 54 includes an annular insert 70 concentric about the wire guide bore 38 and a reciprocable shearing member 72 movable transversely in the enlarged end portion 50 of the shaft 36. The shearing member 72 is moved by a finger 74 formed on a member 76 pivotally retained by a pin 78 to be actuated by a piston-cylinder motor 80. The rear end of both motors 68 and 80 are pivotally connected by pins 82 and 84 respectively to a bracket 86 keyed for rotation with the shaft 36 by a set screw 88. A housing 89 is provided about the motors 68 and 80 and the bracket 86.

To control the angular position of the shaft 36 and thus of the bending head 24 about the axis of the wire guide bore 38, the rear end of the shaft 36 is keyed to a sprocket gear 90 in mesh with a gear 92 journaled on a counter shaft 94. The gear 92 carries an integral pinion 96 in mesh with a reciprocable rack 98 shown most clearly in FIG. 6 of the drawings. The gearing thus constituted is contained within a housing 100 suitably secured to the rear end of the carriage 20 such as by bolts 102. The rack 98 is slidably received by bearings 104 within an appropriately shaped portion of the housing 100 and the end 106 thereof extending outwardly from the housing carries a retractable cam follower 108. A piston-cylinder type air motor 110 carried also on the end 106 of the rack 98 serves to advance or retract the follower 108 along a vertical axis. Positioned below the follower 108 is a cam plate 112 defining a cam track 113 and supported on a bed 114, in turn carried by standards 116 on the pedestal 10. It will be appreciated therefore, that when the follower 108 is extended downwardly into engagement with the cam plate 112, the position of the rack 98 in the carriage and thus the angular position of the bending head 24 will be governed by the cam plate 112 and its track 113. Also, an important feature of this invention involves the facility for the cam plate 112 to be removably fixed to the bed 114 to facilitate the substitution of different cam tracks. While any suitable means may be employed to this end, the fixing of the cam plate 112 to the bed 114 by means such as bolts 118 passing through the cam plate and threaded into the bed 114 will serve this function adequately.

Figure 7:
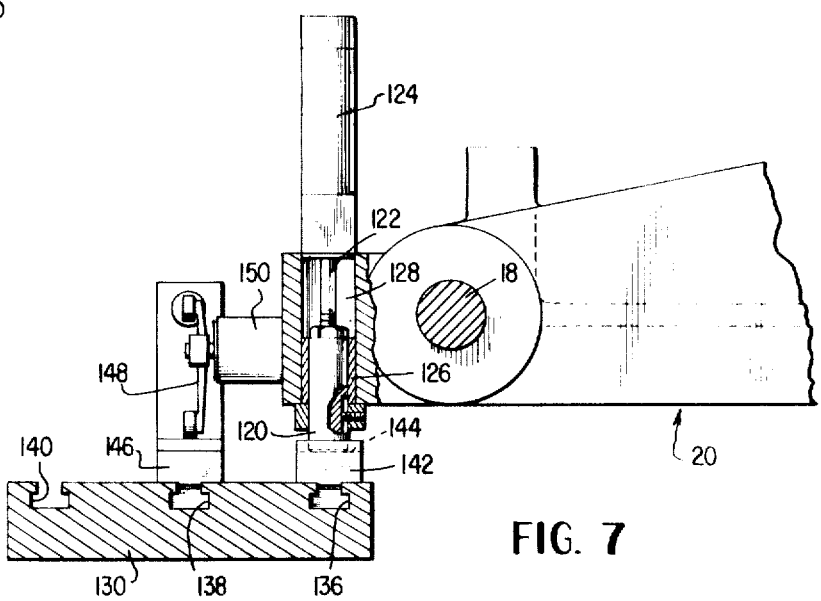
FIG. 7 is an enlarged fragmentary cross-section taken along line 7—7 of FIG. 2.

Positioned on the opposite side of the carriage from the follower 108 is a reciprocable carriage latching pawl 120 carried on the plunger 122 of a vertically disposed piston-cylinder motor 124 as shown most clearly in FIGS. 1 and 7 of the drawings. The latching pawl is slidably disposed in a sleeve 126 secured within a bore 128 on the end of the carriage adjacent the way 18. Positioned immediately below this end of the carriage is an enlongated bed 130 supported above the pedestal 10 on standards 132 and 134. As shown in FIG. 7 of the drawings the bed 130 is provided with three under-cut tracks 136, 138 and 140, respectively, in its upper surface. In the track 136, is positioned a series of carriage stop members or blocks 142, each having one or more notches 144 for receiving the latch pawl 120 when it is moved into a lower or engaging position. It will be noted further that the end of the latch pawl 120 and the notches 144 are tapered on at least one side in complementary fashion so that as the pawl moves downwardly into one of the notches 144, the carriage 20 is very accurately positioned and locked relative to movement along the ways 16 and 18. Each of the blocks 142 is retained in place such as by the set screw (not shown) or alternatively, the blocks could be formed as portions of a continuous programming strip received in the track 136. The blocks 142 together with the latching pawl 120 are coordinated with the cam track 113 to provide the desired interval and direction of bends to form an undulating spring in a manner which will be described more completely hereinafter.

The track 138 receives a series of camming blocks 146 coordinated with the blocks 142 in the track 136 and cooperable with an actuating arm 148 for a microswitch assembly 150. The actuating arm is associated with the microswitch assembly in such a way that the switch is in its normal position when the rocker arm is vertical and in an actuated position when the rocker arm is rotated clockwise as viewed in FIG. 1, for example. Rotation of the arm 148 in a counterclockwise direction as viewed in FIG. 1, has no effect on the switch 150. Also, an adjustable stop 152 may be provided in the track 136 for engaging the upper portion of the rocker arm 148 to actuate the switch assembly 150 in a manner which will become more apparent from the description to follow.

Figure 6:
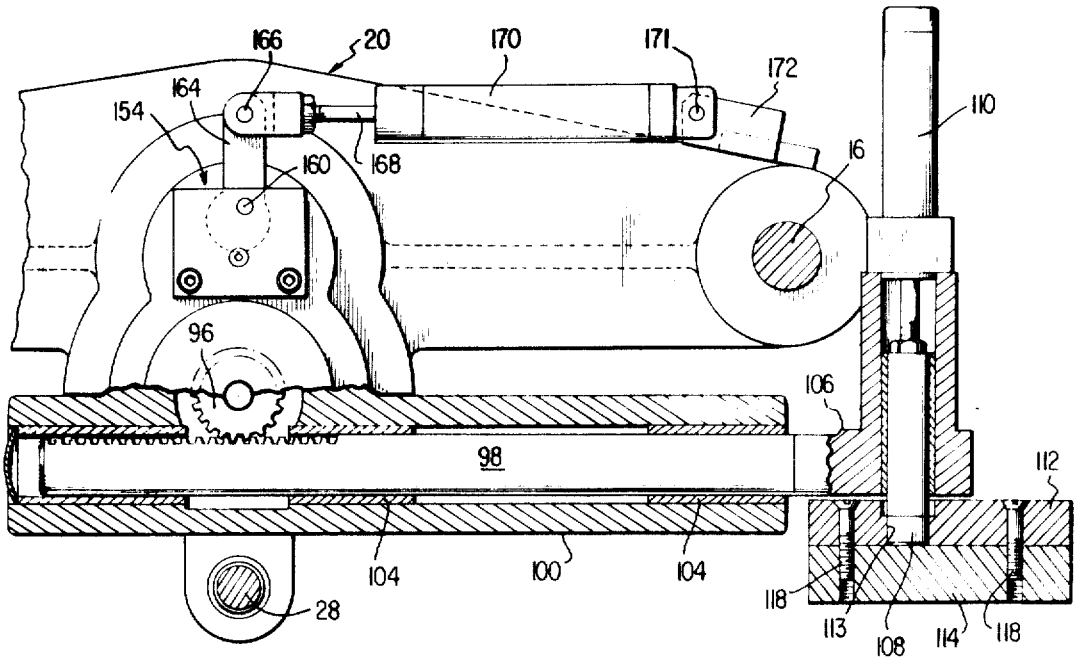
FIG. 6 is an enlarged fragmentary cross-section taken along line 6—6 of FIG. 2.

In addition to the aforementioned components supported on the carriage 20, a wire clamp 154 is provided on a rear surface 155 of the gear housing 100 as shown most clearly in FIGS. 2, 3 and 6. The wire clamp 154 includes an eccentric 156 positioned adjacent an aperture 158 lying on the axis of the wire guide bore 38 in the rotatable shaft 36. The eccentric is pivoted on a pin 160 to operate between the rear surface 155 on the housing 100 and a plate 162 of generally L-shaped cross-section as seen in FIG. 3 secured to the gear housing 100. The eccentric is formed integrally with an arm 164 connected by a pin 166 to the plunger 168 of a piston-cylinder motor 170. As shown in FIG. 6, the end of the motor 170 is connected to the carriage 20 by a pin 171 secured in a suitable bracket 172. It will be appreciated therefore, that upon the plunger 168 being advanced by the motor 170 the eccentric 156 will be pivoted about the pin 160 to seize a wire extending through the aperture 158, against the base of the L-shaped plate member 162.

To retain or fix a length of wire to be bent during operation of the carriage 20 and associated components, a stationary clamp 173 and an actuating motor 174 are mounted on the upper end of the standard 32. As shown most clearly in FIG. 1, the clamp 173 is disposed transversely of a bore 175 in the upper end of the standard 32, the bore 175 being on the same axis of the guide bore 38. When therefore, clamp 173 is moved downwardly by the motor 174, a wire passing through the bore 175 will be gripped and thus fixed against axial and angular movement. Since the wire is in most instances supplied continuously from a wire straightening machine which in itself, serves to hold the wire stationary the clamp 173 may not be needed under all conditions of operation. Also, it will be appreciated that the clamp 173 could be located on the straightening machine.

Figure 8:
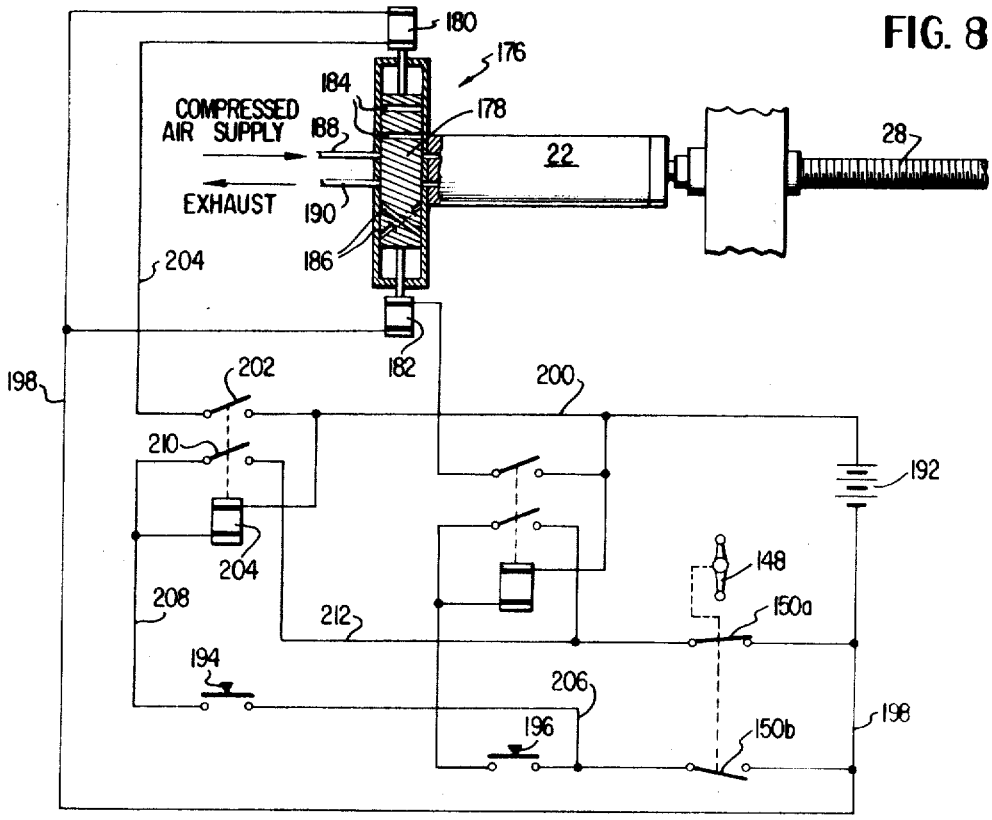
FIG. 8 is a schematic diagram showing an exemplary form of control circuit for the carriage moving motor of the apparatus of this invention.

Although the complete control system by which the motors 22, 68· 80, 110, 124, 170 and 174 are operated in a pre-established sequence to effect automatic operation is not shown in the drawings, it is contemplated that each of the respective motors aforementioned will be operated by compressed air and equipped with a solenoid actuate dvalve controlled by appropriate electric circuitry. By way of example, a control arrangement for the carriage feed screw driving motor 22 is shown in FIG. 8 of the drawings. As aforementioned, the motor 22 is a conventional reversible air motor operated under the control of a solenoid actuated slide valve 176. As shown in FIG. 8, the valve 176 includes a valve body 178 movable in opposite directions from the neutral position shown by solenoids 180 and 182. The valve body has a pair of parallel ports 184 on one end and a pair of cross ports 186 on the other end. When, therefore, the valve body 178 is drawn by the solenoid 180 into a position such that the cross ports 186 become aligned with an inlet 188 supplied with compressed air and an exhaust line 190, the motor will be operated in one direction to drive the feed screw 28 in that direction. Similarly, when the solenoid 182 is energized to align the parallel ports 184 with the supply and exhaust lines 188 and 190 respectively, the motor and thus the screw 28 will rotate in the opposite direction. When both solenoids 180 and 182 are de-energized the valve body 178 moves to the neutral position shown in FIG. 8 in which the ports are completely closed to stop the motor 22. For purposes of the description to follow, it will be assumed that when solenoid 180 is energized, the motor 22 will operate in a direction to feed the screw 28 and thus the carriage 20 rearwardly of the machine or in a direction from left to right as viewed in the drawings, whereas energization of the solenoid 182 will move the carriage forwardly in the opposite direction.

The solenoids 180 and 182 are arranged in a circuit with a battery 192 to be initially energized by normally open, momentarily closable switches 194 and 196 respectively. Both solenoids 180 and 182, however, are de-energized and thus the motor stopped in response to the position of a pair of switches 150a and 150b forming, in good part, the limit switch assembly 150 controlled by the rocker arm 148. The switches 150a and 150b are mechanically inter-connected to each other and to the rocker arm in such a manner that when rocker arm is in a normal vertical position, as shown in FIG. 8, the switch 150a is open and the switch 150b is closed. When, however, the rocker arm 148 is rotated in a clockwise direction to the position shown in FIG. 1, for example, the positions of the switches 150a and 150b are reversed. Further, and as mentioned above, rotation of the rocker arm 148 in a counterclockwise direction as viewed in the drawings has no effect on either of the switches 150a and 150b. Thus, assuming the switch 150a to be opened and the switch 150b to be closed, as they will be when the rocker arm is held in the position shown in FIG. 1, the solenoid 180 may be energized to operate the motor 22 by closing the switch 194. With the switch 194 in a closed position, a circuit across the solenoid 180 and the battery 192 is completed on one side by a line 198 and on the other side by a line 200, a relay switch 202 and a line 204. At this point, the relay switch 202 is closed by energization of a relay coil 204 by a circuit including line 198, switch 150b, line 206, switch 194, a line 208 and line 200. A holding circuit including line 208, a relay switch 210, a line 212 and switch 150a is provided for the relay coil 204. Hence, so long as the switch 150b remains closed and the switch 150a remains open, the solenoid 180 is operated solely under the control of the switch 194. When however, the arm 148 moves to its normal position wherein the switch 150a is closed and the switch 150b is opened, the circuit including switch 194 becomes disabled. At this time, switch 150a completes the holding circuit including switch 210 and the relay coil 204. Then, as soon as the switch 150a is open, the holding circuit for the relay coil 204 is opened resulting in relay switch 202 opening to de-energize the solenoid 180 and stop the motor 22. It will be appreciated that since the switch 194 is of the type which is normally opened and momentarily closed, by the time the switch 150a is closed the switch 194 has been opened to permit the switch 150a to effect sole control over the solenoid 180 and thus the motor 22. Also, it is contemplated that the switch 194 may be associated with another part of the bending machine such as for example the wire bender 52 so that retraction of the finger 58 may generate a signal closing switch 194 to initiate the next bending cycle. Also if desired, a timing circuit may be employed with the switch 194 to retain it in its closed position for a predetermined short perior of time but long enough for the carriage to move sufficiently that the rocker 148 may assume its normal position and the switch 150a its normally closed position.

The circuit for controlling the solenoid 182 is similar in all respects to that for controlling the solenoid 180 and further description thereof is deemed unnecessary. It will be appreciated that in this instance, the switch 196 will be associated with an appropriate part of the machine, such as for example the wire clamp 154, to effect the desired sequence of operation. Also, it is contemplated that each of the other motors in the machine, namely the motors 68, 80, 110, 124, 170 and 174 will each be equipped with a control valve similar to the valve 176 described above with respect to the motor 22 so as to enable use of an automatic electric control system. Since the particular control system for the respective motors is not, in and of itself, a part of this invention these circuits are not shown. It will be appreciated however, that any one of several well knows electrical control systems might be employed for this purpose.

Figure 9:
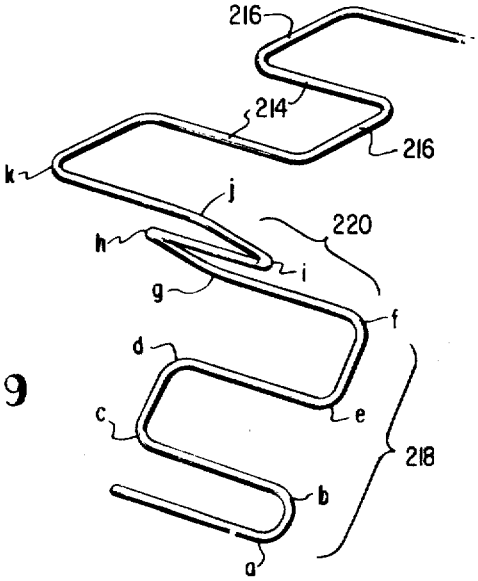
FIG. 9 is a fragmentary perspective view of a spring formed by the apparatus of this invention.
Figure 12:
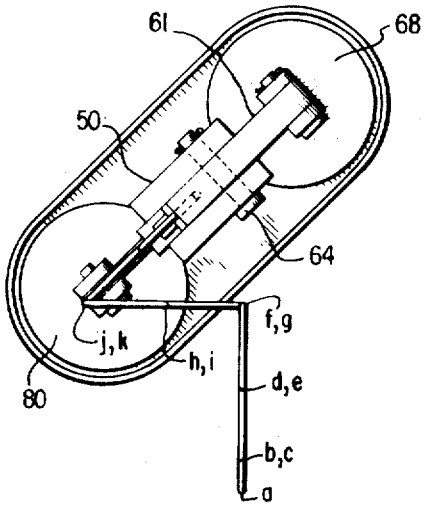

In order to understand the manner in which the apparatus of this invention operates, reference will be had to an example of a typical undulating spring which is shown in FIG. 9 of the drawings. Such springs, as above indicated, comprise a series of laterally extending torsion bars 214 connected alternately on opposite sides by bending bars 216. Also it will be noted that the undulations established by the torsion bars and bending bars may lie in different planes. In a typical seat cushion, for example, the front and rear portions of the spring are formed having lengths 218 and 220 which lie in planes intersecting each other at an angle. Thus, in the spring shown in FIG. 9 the length 218 is established at one end by a loop for connection to a frame having closely spaced bends a and b. Further bends c, d, e and f serve to complete the length 218. The length 220 is begun by a bend g in a plane making approximately a right angle with respect to the plane established by bends a–f. The section or length 220 is then completed in the spring shown by bends h, i and j. The primary cushion support portion of the spring begins with a bend k and continues with subsequent bends, each of which may depart slightly from the plane of the preceding bend to establish the arcuate configuration required by the seat cushion design.

To form the spring illustrated in FIG. 9 therefore, the cycle of operation will be assumed to start upon retraction of the cutter motor 80 after a preceding spring has been formed and severed from a length of wire extending through the wire guide bore 38. It will be appreciated that at this point, the carriage 20 will be positioned toward the rear end of the ways 16 and 18 near the standard 32 and fixed nut 30 through which the feed screw 28 extends. At this point, the solenoid 180 is energized to operate the motor 22 and feed screw 28 to move the carriage rearwardly so as to move the bending head 52 into a position to make the first bend a in the wire extending through the guide bore 38. As mentioned above, the wire from which the spring shown in FIG. 9 is formed will in most instances be fed from a wire straightening machine positioned rearwardly of the bending machine or to the right of the pedestal 10 as shown in FIG. 1, for example, and through the bore 175 in the standard 32 to be held or released by the clamp 173.

Figure 10:
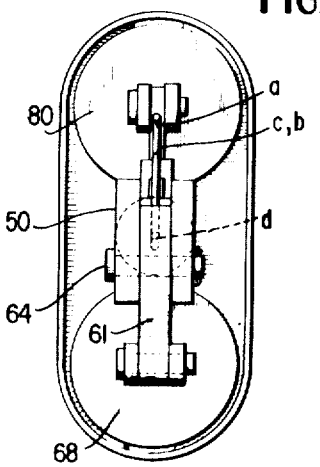
FIGS. 10–12 are end views of the wire bending head of the apparatus of this invention in different positions during the formation of an undulating spring.
Figure 11:
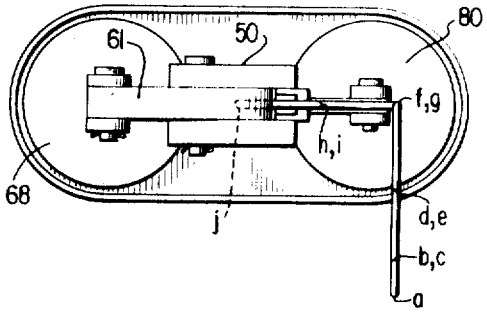
Figure 13:
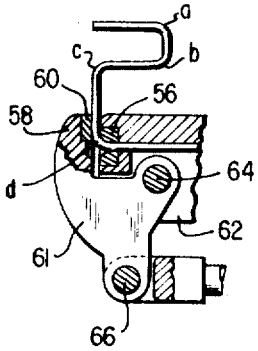
FIGS. 13–15 are fragmentary side views of the wire-bending head in different positions during the formation of an undulating wire spring.
Figure 14:
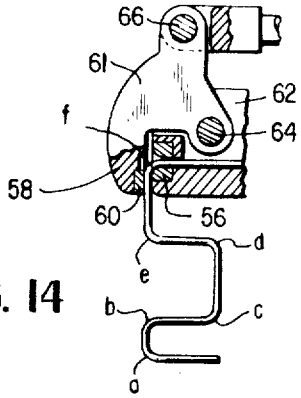

As soon as the carriage reaches the position mentioned above wherein the wire bender 52 is properly positioned with respect to the wire, a motor 22 is stopped by opening of the switch 150a in the manner above-mentioned and the motor 170 is actuated to cause the clamp 154 to fix the wire to the carriage 20. Also at this point, the cam follower 108 is retracted by the motor 110, the latching pawl 120 is retracted by the motor 124, and the clamp 173 retracted by the motor 174. Then, the switch 196 for example is closed to energize the solenoid 182 and operate the motor 22 to advance the carriage forwardly into the position shown in FIGS. 1 and 2 of the drawings. The carriage will be automatically stopped in this position by the upper portion of the rocker arm 148 engaging the adjustable stop 152 to open the switch 150a and thus stop the motor 22. At this point the clamp 154 is released, the clamp 173 is engaged, the cam follower 108 is lowered into the cam track 113 by the motor 110 and the latch pawl 120 is lowered by the motor 124 into the first notch 144 of the first block 142. While the carriage is in this position, the motor 68 is actuated to move the wire bender 52 into the position shown in FIG. 13, for example, to complete the bend a in the wire, a bend through 90°. After the bending finger 58 is retracted by the motor 68, the switch 194 is closed, operating the motor 22 to move the carriage until it is stopped by the arm 148 engaging the next cam lobe presented on the blocks 146 in the track 138 to open the switch 150a and stop the motor 22. The motor 124 is again actuated to drop the latch pawl 120 into the next notch 144 in the blocks 142 after which the motor 68 is again actuated to complete the bend b. Since the bends a and b are adjacent 90° bends, they establish a loop for connection to a seat frame for example defined by a bend through 180°. The same procedure with respect to the operation of the motor 22 to move the carriage and the operation of the motor 124 to retract and advance the latching pawl 120 is repeated until the bending head is in the position to make the bend c. At this point, the cam follower 108 will be moved laterally as shown in FIG. 6 of the drawings due to the configuration of the cam plate 112 and its track 113 so that the bending head 24 is rotated through 180° as shown in FIGS. 10 and 13. The bending cycle is again repeated to effect the bend c in the spring. Then, the bend d is effected with the head in the same angular position as it was for the bend c whereupon it is reversed 180° for the bend e and so forth. When however, the carriage is positioned to make the bend g, which is in a different plane than the bends a–f, the bending head is rotated to the proper angle as determined by the position of the follower 108 in the cam track 113 and the bends g, h, i and j made, the head moving again through 180° between the bends h and i. Since the bend k is again in a different plane from the plane of the bend j, the head is rotated to a position such as that shown in FIG. 11 of the drawings and the bending finger 58 energized to complete the bend k. The carriage and bending head will continue to be operated in this manner until the spring is complete, the pattern of spring to be formed being governed by the cam track 113 in connection with the organization of cam blocks 146 in the track 138 and the latching blocks 142 in the track 136. At the completion of the spring the motor 80 is operated to move the shear plate unwardly to sever the spring from the wire remaining in the guide bore 38 and the cycle is repeated.

Figure 15:
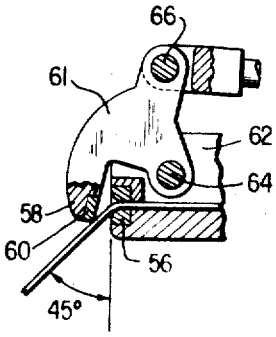

Although in the spring illustrated in FIG. 9, each of the bends is a 90° bend, it is contemplated that the wire may be bent through an angle less than 90° by controlling the stroke of the wire bender motor 68. Hence, and as shown in FIG. 15, a bend of approximately 45° may be made by moving the finger 58 from a retracted position to the position shown in FIG. 15. To make a bend of approximately 45° in this manner during the formation of a spring, appropriate switch actuating cam blocks may be provided in the track 140 of the bed 130. In this manner, a signal may be generated and incorporated in a proper control circuit for the motor 68 so that this motor stops advancing the bending finger 58 at the position shown in FIG. 15.

Thus, it will be seen that by this invention, there is provided an extremely versatile machine for forming various bent wire shapes and which completely fulfills the above-mentioned objects. Also various modifications can be made in the machine illustrated in the drawings and described above. For example, while it is preferred that wire stock be supplied as a continuous length to be cut at the end of a spring forming cycle as described, it is contemplated that several lengths of wire may be used and thus avoid the need for the cutter 54. Also, the programming function served by the cam track 113, the latch blocks 142 and the cam blocks 146 might in some instances be served by a programmed electronic control system operating with the solenoid controlled air motors disclosed or with electric motors.

Since therefore many modifications and substitutions can be made in the apparatus of this invention without departing from the true scope and spirit thereof it is to be understood that the foregoing description is illustrative only, not limiting and that the true spirit and scope of this invention are to be determined by reference to the appended claims.

What is claimed is:

[1. Apparatus for producing a plurality of bends in a wirelike material comprising: means to position the material on a longitudinal axis; a rotatable bending head positioned for rotation about said longitudinal axis; means for producing relative longitudinal movement between said bending head and the material to establish predetermined relative axial positions between said bending head and said material; means for rotating said head to a predetermined radial position for each of said axial positions; and means to actuate said bending head to produce at each axial position a bend in the wire in a radial direction determined by the angular position of said head.]

[2. The apparatus recited in claim 1 including a carriage supporting said bending head for movement along the material on said longitudinal axis.]

[3. Apparatus for producing undulating wire springs comprising: a carriage; means to support said carriage for movement along an axis; means on said carriage for supporting a generally straight length of wire stock on said axis; a rotatable bending head supported on said carriage for rotation about said axis, said bending head being operable to bend the wire in a radial direction from said axis corresponding to the angular position of said head; and programming means to control movement of said carriage along said axis in increments to establish bending stations and to control the angular position of said bending head at each of said stations.]

[4. The apparatus recited in claim 3 in which said programming means includes a cam track extending in the direction of carriage travel and a cam follower on said carriage adapted to engage said cam track, said cam follower being operatively connected to said bending head.]

[5. The apparatus recited in claim 4 in which said programming means includes further, a plurality of carriage stopping elements positioned along the length of carriage travel in predetermined spaced relation, and means on said carriage to stop carriage movement, said last-mentioned means being positioned for operable engagement with said stopping elements.]

[6. The apparatus recited in claim 3 including means to lock said carriage in each of said bending stations.]

[7. A wire-bending apparatus for producing a series of bends in a generally straight wire fixed against rotational and axial movement, said apparatus comprising: a carriage; a pair of spaced parallel ways supporting said carriage for movement thereon, a bending head, means to support said bending head on said carriage for rotation about an axis extending parallel to said ways, said means including a shaft journaled in said carriage and having a central, longitudinal wire guide bore lying on said axis, gear means including a pinion drivably connected to said shaft, a reciprocable rack meshing with said pinion and carried by said carriage; replaceable means defining a cam track extending in a direction generally parallel to said ways, cam follower means connected to said rack and adapted to be received in said cam track to regulate the radial position of said head in accordance with the position of said carriage on said axis; power means for moving said carriage on said ways; a plurality of carriage stopping elements; means for supporting said elements in a path generally parallel to said ways and in predetermined programmed relation to said cam track; and means on said carriage to disable said power means to stop said carriage, said last-mentioned means being controlled by said stopping elements.]

[8. The apparatus recited in claim 7 in which said bending head projects forwardly of said carriage and in which said power means includes a rotatable feed screw supported for axial movement with said carriage, said feed screw extending rearwardly of said carriage, and a fixed nut positioned at the rearward most point of carriage travel, said nut threadably receiving said feed screw.]

[9. The apparatus recited in claim 7 including a latching pawl on said carriage, and in which said means for supporting said stopping elements also carries fixed means defining a plurality of notches, one for each of said bending stations, said notches and said pawl being cooperable to lock said carriage against movement of each of said stations.]

[10. The apparatus recited in claim 9 in which said pawl and said notches are shaped to position said carriage precisely at each of said stations upon said pawl being advanced into the notches.]

[11. The apparatus recited in claim 7 including a wire cutter supported on said carriage.]

[12. The apparatus recited in claim 7 including a wire clamp on said carriage to draw a length of wire from a source.]

[13. The apparatus recited in claim 12 including an additional fixed clamp for holding the wire against rotational and axial movement.]

[14. Apparatus for producing a series of bends in a wirelike material comprising bending means for bending said material, means for producing relative movement between said material and bending means to establish a plurality of bending stations at spaced points along said material, and means for rotating said bending means about said material to establish the direction of bending at said bending stations.]

[15. Apparatus for producing a plurality of bends in a wirelike material comprising bending means for bending said material, means for producing relative movement between said bending means and material to establish a plurality of bending stations at spaced points along said material, means for producing relative rotation between said bending means and material to establish the direction of bend at said bending stations, means for actuating said bending means to produce at said bending stations bends in the material in a direction determined by the relative rotational positioned between said bending means and material, and control means to control automatically the relative movement between said bending means and material and the actuation of said bending means to bend said material at said bending stations in accordance with a predetermined program for bending the material into an element having a predetermined configuration, said control means including means for producing said relative rotation between the bending means and material while said bending means and material are moving from one bending station to another.]

[16. The bending apparatus as claimed in claim 15 wherein said control means includes cam follower means adapted to cooperate with camming means associated with said program, said cam follower means controlling the relative angular position between said bending head and material at said bending stations.]

[17. The bending apparatus as claimed in claim 15 including camming means removably mounted on said bending apparatus to provide at least part of said program, and wherein said control means includes cam follower means engaging said camming means for controlling the relative angular position of said bending means and material at said bending stations, said camming means actuating said cam follower means while said bending means and material are moving from one bending station to another.]

[18. The bending apparatus as claimed in claim 15 including cut-off means actuated by said control means for cutting said material after a predetermined number of bends to sever said element of predetermined configuration from the remaining material.]

[19. The bending apparatus as claimed in claim 18 wherein said material is long enough to be formed into a plurality of said elements, and including program means for activating said control means through a plurality of cycles with each cycle comprising said predetermined number of bends followed by actuation of said cut-off means whereby said apparatus automatically produces a plurality of said elements having the same predetermined configuration.]

20. Apparatus for producing a plurality of bends in a wirelike material comprising bending means for bending said material, means for producing relative movement between said bending means and material to establish a plurality of bending stations at spaced points along said material, means for producing relative rotation between said bending means and material to establish the direction of bend at said bending stations, means for actuating said bending means to produce at said bending stations bends in the material in a direction determined by the relative rotational position between said bending means and material, cut-off means for cutting said material after a predetermined number of bends, control means to control automatically the relative movement between said bending means and material and the actuation of said bending means to bend said material and the actuation of said cut-off means, and program means for actuating said control means automatically through a plurality of cycles with each cycle comprising a predetermined number of bends followed by actuation of said cut-off means whereby said apparatus can produce automatically from a long length of said wirelike material a plurality of said elements having the same predetermined configuration.

[21. The apparatus as claimed in claim 1 wherein said bending head comprises a bending anvil for determining the radius of the bend to be made in said material, and means moveable from a retracted position to an advanced position for bending the material over said bending anvil.]

[22. The apparatus as claimed in claim 21 wherein said bending head has an aperture therethrough on the axis of rotation thereof for positioning said material relative to said bending anvil in a manner to facilitate the bending.]

[23. The apparatus as claimed in claim 1 including control means to control automatically the relative movement between said bending head and material and the actuation of said bending head to bend said material at said axial positions all in accordance with a predetermined program for bending the material into an element having a predetermined configuration.]

[24. The apparatus as claimed in claim 23 wherein said control means includes means for rotating said bending head while said bending head and material are moving from one axial position to another.]

[25. The apparatus as claimed in claim 23 including cut-off means actuated by said control means for cutting said material after a predetermined number of bends to sever said element of predetermined configuration from the remaining material.]

[26. The apparatus as claimed in claim 25 including program means for activating said control means automatically through a plurality of cycles with each cycle comprising said predetermined number of bends followed by actuation of said cut-off means whereby said apparatus automatically produces from a long length of said material a plurality of said elements having the same predetermined configuration.]

[27. The apparatus as claimed in claim 26 wherein said control means is adapted to cooperate with a plurality of different program means for producing a plurality of different elements each having a configuration determined by a different one of the program means.]

[28. The apparatus as claimed in claim 23 wherein said control means includes cam follower means adapted to cooperate with camming means associated with said program for controlling the rotation of said bending head.]

[29. The apparatus as claimed in claim 28 including camming means removably mounted on said apparatus and operatively engaging said cam follower means, said camming means actuating said cam follower means while said bending head and material are moving from one axial position to another to determine the angular position of said bending head relative to said material at each of said axial positions.]

[30 The apparatus as claimed in claim 29 wherein said control means includes means for controlling the actuation of said bending head at each axial position to establish the angle through which the material is bent at each of said axial positions.]

[31 The apparatus as claimed in claim 30 wherein said control means activates said apparatus in response to said program to produce longitudinal movement from axial position to axial position with a stop at each axial position to enable the bend to be made at each axial position, said control means beginning rotation of the bending head during relative longitudinal movement from one axial position to the next axial position and completing rotation of the bending head to the desired angular position for said next axial position before said next axial position is reached.]

*32. Apparatus for producing a series of bends in a wirelike material comprising bending means for bending said material, means for producing relative movement between said material and bending means to establish a plurality of bending stations at spaced points along said material, means for rotating said bending means about said material to establish the direction of bending at said bending station, cutoff means for cutting said material after a predetermined number of bends to sever an element having a predetermined configuration from the remaining material.*

*33. Apparatus as set forth in claim 32 including means to position the material on a longitudinal axis; said bending means includes a rotatable bending head positioned for rotation about said longitudinal axis; said means for producing relative movement provides longitudinal movement between said bending head and the material to establish predetermined relative axial positions between said bending head and said material and at said bending stations; and means to actuate said bending head to produce at each axial position a bend in the material in a radial direction determined by the angular position of said head.*

*34. The apparatus as claimed in claim 33 wherein said bending head comprises a bending anvil for determining the radius of the bend to be made in said material, and means movable from a retracted position to an advanced position for bending the material over said bending anvil.*

*35. The apparatus as claimed in claim 34 wherein said bending head has an aperture therethrough on the axis of rotation thereof for positioning said material relative to said bending anvil in a manner to facilitate the bending.*

*36. The apparatus as claimed in claim 33 including control means to control automatically the relative movement between said bending head and material and the actuation of said bending head to bend said material at said axial positions all in accordance with a predetermined program for bending the material into said element having said predetermined configuration.*

*37. The apparatus as claimed in claim 36 wherein said control means includes means for rotating said bending head while said bending head and material are moving from one axial position to another.*

*38. The apparatus as claimed in claim 36 wherein said cutoff means is actuated by said control means for cutting said material.*

*39. The apparatus as claimed in claim 38 including program means for activating said control means automatically through a plurality of cycles with each cycle comprising said predetermined number of bends followed by actuation of said cutoff means whereby said apparatus automatically produces from a long length of said material a plurality of said elements having the same predetermined configuration.*

*40. The apparatus as claimed in claim 39 wherein said control means is adapted to cooperate with a plurality of different program means for producing a plurality of different elements each having a configuration determined by a different one of the program means.*

*41. The apparatus as claimed in claim 36 wherein sad control means includes cam follower means adapted to cooperate with camming means associated with said program for controlling the rotation of said bending head.*

*42. The apparatus as claimed in claim 41 including camming means removably mounted on said apparatus and operatively engaging said cam follower means, and means to actuate said camming means while said bending head and material are moving from one axial position to another, said camming means being arranged and constructed to control said cam follower means in a manner to determine the angular position of said bending head relative to said material at each of said axial positions.*

*43. The apparatus as claimed in claim 42 wherein said control means includes means for controlling the actuation of said bending head at each axial position to establish the angle through which the material is bent at each of said axial positions.*

*44. The apparatus as claimed in claim 43 wherein said control means activates said apparatus in response to said program to produce longitudinal movement from axial position to axial position with a stop at each axial position to enable the bend to be made at each axial position, said control means beginning rotation of the bending head during relative longitudinal movement from one axial position to the next axial position and completing rotation of the bending head to the desired angular position for said next axial position before said next axial position is reached.*

*45. The apparatus recited in claim 33 including a carriage supporting said bending head for movement along the wire.*

*46. The apparatus as claimed in claim 45 including means to support said carriage for movement along an axis; means on said carriage for supporting a generally straight length of wire stock on said axis; said bending head being supported on said carriage for rotation about said axis, and programming means to control movement of said carriage along said axis in increments to establish bending stations and including said means for rotating said bending head to control the angular position of said bending head at each of said stations.*

*47. The apparatus recited in claim 46 in which said programming means includes a cam track extending in the direction of carriage travel and a cam follower on said carriage adapted to engage said cam track, said cam follower being operatively connected to said bending head.*

*48. The apparatus recited in claim 47 in which said programming means includes further, a plurality of carriage stopping elements positioned along the length of carriage travel in predetermined spaced relation, and means on said carriage to stop carriage movement, said last-mentioned means being positioned for operable engagement with said stopping elements.*

*49. The apparatus recited in claim 45 including means to lock said carriage in each of said bending stations.*

*50. The apparatus recited in claim 33 including a pair of spaced parallel ways supporting said carriage for movement thereon, said bending head being rotatably supported on said carriage for rotation about an axis extending parallel to said ways, a shaft journalled in said carriage and having a central, longitudinal wire guide bore lying on said axis, gear means including pinion drivably connected to said shaft, a reciprocably rack meshing with said pinion and carried by said carriage; replaceable means defining a cam track extending in a direction generally parallel to said ways, cam follower means connected to said rack and adapted to be received in said cam track to regulate the radial position of said head in accordance with the position of said carriage on said axis; power means for moving said carriage on said ways; a plurality of carriage stopping elements; means for supporting said elements in a path generally parallel to said ways and in predetermined programmed relation to said cam track; and means on said carriage to disable said power means to stop said carriage, said last-mentioned means being controlled by said stopping elements.*

*51. The apparatus recited in claim 50 in which said bending head projects forwardly of said carriage and in which said power means includes a rotatable feed screw supported for axial movement with said carriage, said feed screw extending rearwardly of said carriage, and a fixed nut positioned at the rearward most point of carriage travel, said nut threadedly receiving said feed screw.*

*52. The apparatus recited in claim 50 including a latching pawl on said carriage, and in which said means for supporting said stopping elements also carries fixed means defining a plurality of notches, one for each of said bending stations, said notches and said pawl being cooperable to lock said carriage against movement at each of said stations.*

*53. The apparatus recited in claim 52 in which said pawl and said notches are shaped to position said carriage precisely at each of said stations upon said pawl being advanced into the notches.*

*54. The apparatus recited in claim 50 wherein said cutoff means comprises a wire cutter supported on said carriage.*

*55. The apparatus recited in claim 50 including a wire clamp on said carriage to draw a length of wire from a source.*

*56. The apparatus recited in claim 55 including an additional fixed clamp for holding the wire against rotational and axial movement.*

*57. The apparatus recited in claim 32 including control means to control automatically the relative movement between said bending means and material and the actuation of said bending means to bend said material at said bending stations in accordance with a predetermined program for bending the material into an element having a predetermined configuration, said control means including means for producing said relative rotation between the bending means and material while said bending means and material are moving relative to one another from one bending station to another.*

*58. The bending apparatus as claimed in claim 57 wherein said control means includes cam follower means adapted to cooperate with camming means associated with said program, said cam follower means controlling the relative angular position between said bending head and material at said bending stations.*

*59. The bending apparatus as claimed in claim 57 including camming means removably mounted on said bending apparatus to provide at least part of said program, and wherein said control means includes cam follower means engaging said camming means for controlling the relative angular position of said bending means and material at said bending stations, and means to actuate said camming means while said bending means and material are moving from one bending station to another.*

*60. The bending apparatus as claimed in claim 57 wherein said cutoff means is actuated by said control means for cutting said material.*

*61. The bending apparatus as claimed in claim 60 wherein said material is long enough to be formed into a plurality of said elements, and including program means for activating said control means through a plurality of cycles with each cycle comprising said predetermined number of bends followed by actuation of said cutoff means whereby said apparatus automatically pro-*

*duces a plurality of said elements having the same predetermined configuration.*

References Cited

The following references, cited by the Examiner, are of record in the patented file of this patent or the original patent.

UNITED STATES PATENTS

| | | | |
|---|---|---|---|
| 3,045,740 | 7/1962 | Davis | 140—71 |
| 3,373,587 | 3/1968 | Shubin et al. | 72—7 |

| | | | |
|---|---|---|---|
| 319,603 | 6/1885 | Muncaster | 72—406 |
| 2,382,745 | 8/1945 | Powers | 72—156 |
| 3,144,886 | 8/1964 | Willard | 140—71 |
| 3,175,386 | 3/1965 | Sproul | 72—384 |

LOWELL A. LARSON, Primary Examiner

U.S. Cl. X.R.

72—7, 219